United States Patent
Guichard et al.

(10) Patent No.: US 8,891,553 B2
(45) Date of Patent: Nov. 18, 2014

(54) SELECTIVE LABEL RETENTION IN A LABEL SWITCHING NETWORK

(75) Inventors: Jim Guichard, New Boston, NH (US); Eric Rosen, Chelmsford, MA (US); Syed Kamran Raza, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 768 days.

(21) Appl. No.: 12/653,691

(22) Filed: Dec. 16, 2009

(65) Prior Publication Data

US 2011/0142046 A1 Jun. 16, 2011

(51) Int. Cl.
*H04J 3/24* (2006.01)
*H04L 29/06* (2006.01)
*H04L 12/723* (2013.01)
*H04L 12/715* (2013.01)
*H04L 12/66* (2006.01)
*H04L 12/70* (2013.01)

(52) U.S. Cl.
CPC ..... *H04L 29/0653* (2013.01); *H04L 2012/5652* (2013.01); *H04L 45/50* (2013.01); *H04L 45/04* (2013.01); *H04L 12/66* (2013.01)
USPC ............... 370/474; 370/401; 370/392

(58) Field of Classification Search
None
See application file for complete search history.

(56) References Cited

U.S. PATENT DOCUMENTS

| | | | | |
|---|---|---|---|---|
| 7,197,033 | B2 * | 3/2007 | Reeves et al. | 370/389 |
| 7,230,913 | B1 | 6/2007 | Vasseur et al. | |
| 7,246,175 | B1 | 7/2007 | Tappan et al. | |
| 7,260,083 | B2 * | 8/2007 | Reeves et al. | 370/351 |
| 7,343,423 | B2 | 3/2008 | Goguen et al. | |
| 7,345,944 | B1 | 3/2008 | Jenkins, IV | |
| 7,599,349 | B2 | 10/2009 | Vasseur et al. | |
| 8,018,939 | B2 * | 9/2011 | Reeves et al. | 370/392 |
| 8,176,201 | B1 * | 5/2012 | Minei et al. | 709/238 |
| 2002/0071439 | A1 * | 6/2002 | Reeves et al. | 370/400 |
| 2006/0034251 | A1 | 2/2006 | Sivabalan et al. | |
| 2006/0268853 | A1 | 11/2006 | Guichard et al. | |

OTHER PUBLICATIONS

LDP Specification, RFC 5036, L. Anderson et al., Oct. 2007.
Multiprotocol Label Switching Architecture, RFC 3031, E. Rosen et al., Jan. 2001.

* cited by examiner

*Primary Examiner* — Hassan Phillips
*Assistant Examiner* — Mark A Mais
(74) *Attorney, Agent, or Firm* — Cindy Kaplan

(57) ABSTRACT

In one embodiment, a method includes receiving from a label distribution peer, a prefix/FEC to label mapping at a network device and processing the prefix/FEC to label mapping at the network device, wherein processing includes determining if a next hop interface of the prefix/FEC is in a same area as a link between the network device and the label distribution peer. The method further includes retaining the prefix/FEC to label mapping if the label distribution peer is a next hop for the prefix/FEC and if the next hop interface of the prefix/FEC is in the same area as the link between the network device and the label distribution peer, otherwise discarding the prefix/FEC to label mapping. An apparatus is also disclosed.

20 Claims, 4 Drawing Sheets

SELECTIVE LABEL RETENTION IN A LABEL SWITCHING NETWORK

BACKGROUND

The present disclosure relates generally to communications networks, and more particularly, to label retention in a label switching network.

In a Multiprotocol Label Switching (MPLS) network, packets are assigned labels by Label Switching Routers (LSRs) and forwarded along a Label Switched Path (LSP). The label represents a Forwarding Equivalence Class (FEC) to which that packet is assigned. To assure that traffic is forwarded correctly, each LSR creates mappings between FECs and the labels used as an index to a forwarding table at that LSR. A Label Distribution Protocol (LDP) is used by the LSRs to inform other LSRs of the label/FEC mapping it has made for a given FEC, which can then be used by the receiving LSR to forward labeled packets towards the advertising LSR.

Conventional MPLS implementations have two available modes for retaining label information received from a label distribution peer; conservative label retention and liberal label retention. If an LSR supports conservative label retention, the router maintains only label/FEC mappings that will be used for forwarding packets. If an LSR operates in liberal label retention mode, the router keeps all received label/FEC mappings, regardless of whether or not the mapping is from its next hop router for the FEC at a given time.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
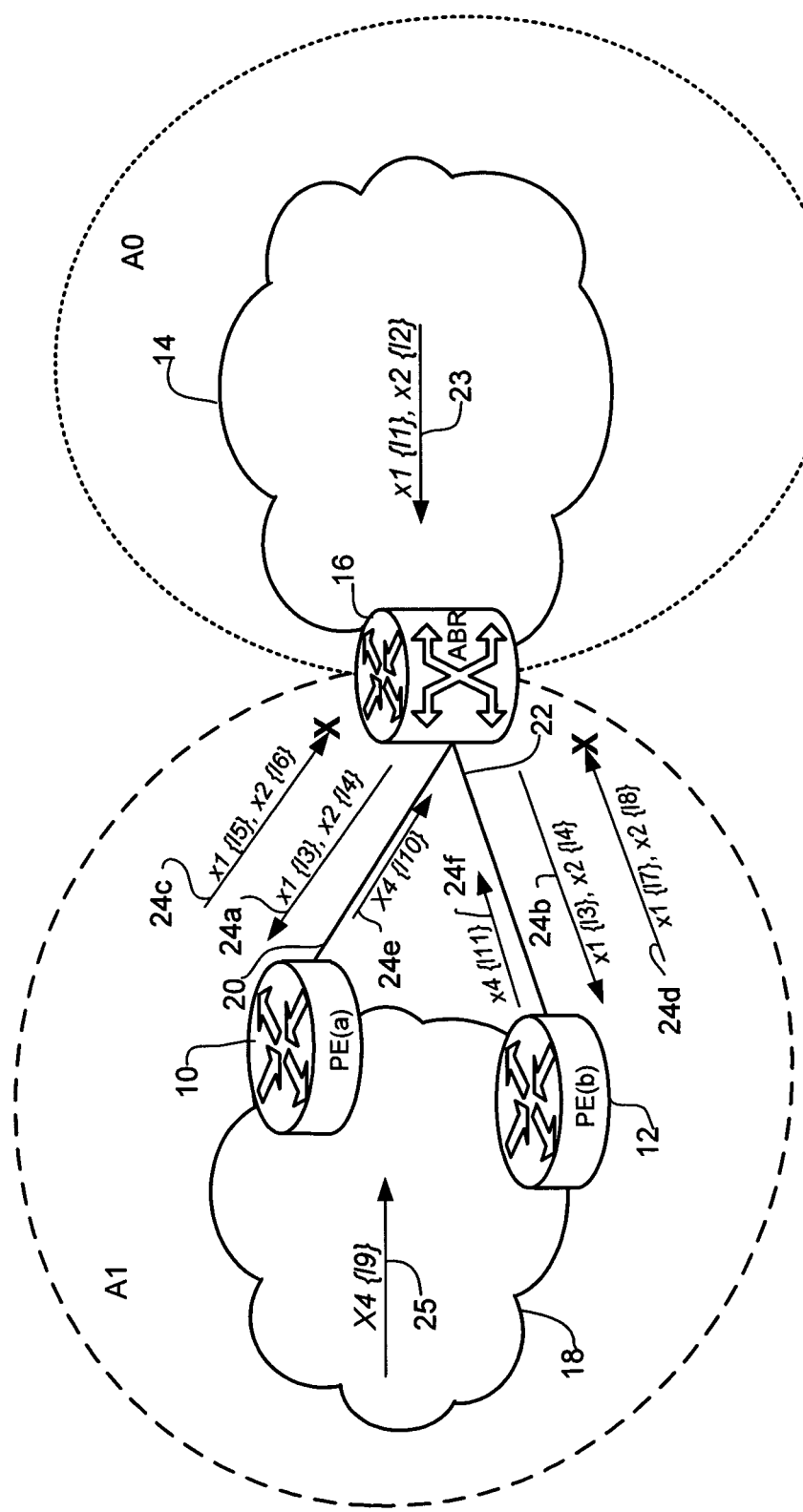
FIG. 1 illustrates an example of a network in which embodiments described herein may be implemented.

In one embodiment, a method generally comprises receiving from a label distribution peer, a prefix/FEC to label mapping at a network device and processing the prefix/FEC to label mapping at the network device, wherein processing includes determining if a next hop interface of the prefix/FEC is in the same area (e.g., IGP area) as a link between the network device and the label distribution peer. The method further includes retaining the prefix/FEC to label mapping if the label distribution peer is a next hop for the prefix/FEC and the next hop interface of the prefix/FEC is in the same area as the link between the network device and the label distribution peer, otherwise discarding the prefix/FEC to label mapping.

In another embodiment, an apparatus generally comprises a processor for receiving from a label distribution peer, a prefix/FEC to label mapping, determining if a next hop interface of the prefix/FEC is in a same area (e.g., IGP area) as a link between the apparatus and the label distribution peer, and retaining the prefix/FEC to label mapping if the label distribution peer is a next hop for the prefix/FEC and the next hop interface of the prefix/FEC is in the same area as the link from the apparatus to the label distribution peer, otherwise discarding the prefix/FEC to label mapping. The apparatus further comprises memory for storing area information.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other embodiments and applications without departing from the scope of the invention. Thus, the invention is not to be limited to the embodiments shown, but is to be accorded the widest scope consistent with the principles and features described herein. For purpose of clarity, details relating to technical material that is known in the technical fields related to the embodiments have not been described in detail.

In an MPLS (Multi-Protocol Label Switching) network, each LSR (Label Switching Router) makes forwarding decisions based on a label of a corresponding packet. As a packet travels through the network, each LSR along an LSP (Label Switched Path) strips off an existing label and applies a new label to the packet prior to forwarding the packet to the next LSR. The new label informs the next router in the path how to forward the packet to a downstream node in the MPLS network. The label represents a Forwarding Equivalence Class (FEE) to which the packet is assigned. FEC refers to a group of packets that are forwarded in the same manner. The decision to bind a particular label to a particular FEC is made by an LSR which is downstream with respect to that binding.

Label Distribution Protocol (LDP) is a protocol for distributing labels in a label switching network. LDP defines a set of procedures by which one LSR informs another LSR of the label/FEC mappings (bindings) it has made. LDP provides a mechanism for LSR peers to discover one another and establish communications and may also be used to tear down sessions, advertise label mappings, withdraw previously advertised mappings, and provide various other types of notifications.

For each route in an LSR's routing table, the LSR allocates a label and creates an entry in its Label Forwarding Information Base (LFIB). The LSR then advertises a mapping between the label and an FEC to other adjacent LSRs. When an LSR receives label/FEC mapping information and makes a decision to retain the mapping information, as described below, the LSR places the label into an LFIB entry associated with the path along which packets belonging to the FEC travel.

When using LDP to distribute label/FEC mappings, two modes of operation are available; Downstream Unsolicited (DU); and Downstream on Demand (DoD). In downstream unsolicited mode, an LSR may distribute mappings to other LSRs that have not explicitly requested them. The LSR is therefore allowed to send mappings to its peers whether or not they have requested the mappings. In downstream on demand mode, an LSR may explicitly request from its next hop LSR for a particular FEC, a label mapping for that FEC. The LSR thus waits for a specific label mapping request from its upstream peers before distributing its local label mappings.

Conventional MPLS implementations have only two available modes for label retention; conservative and liberal. An LSR operating in conservative label retention mode discards mappings between a label and FEC that are received from an LSR that is not its next hop for that FEC. An LSR operating in liberal label retention mode maintains all received label mappings from all peers, even if received from an LSR that is not its next hop for that FEC.

The main advantage of conservative label retention is that only labels used for forwarding packets are maintained. An LSR operating in conservative label retention mode thus maintains fewer peer labels than required for liberal label retention. However, liberal label retention allows for quicker adaptation to routing changes and faster convergence since it is not necessary to obtain a label mapping for an FEC from a peer during a routing convergence event, as the LSR already has all available mappings stored locally.

In conventional systems, downstream unsolicited mode is often used with liberal label retention. This combination provides some positive convergence characteristics, as noted above, however, it introduces unnecessary label distribution and label retention. The unnecessary label distribution results from label mappings that are sent for FECs for which the sending LSR is not the next hop, as viewed from the receiving LSR. The unnecessary label retention refers to a receiving LSR maintaining all label mappings regardless of whether or not they are currently (or will ever be) used for forwarding. This results in an increasing requirement in terms of the number of LDP peer advertised labels that the LSR needs to store.

The embodiments described herein provide a selective label retention mode so that an LSR is able to selectively retain or discard label mappings from peers that are not the current next hop for a given FEC. The embodiments may be used in combination with downstream unsolicited mode, for example.

Referring now to the drawings, and first to FIG. 1, an example of a network in which the embodiments described herein may be implemented is shown. The embodiments operate in the context of a data communications network including multiple nodes. Some of the nodes in a network that employs the embodiments may be network devices such as routers, gateways, or switches. In the example shown in FIG. 1, provider edge routers PE(a) 10, PE(b) 12 are in communication with network 14 through area border router ABR 16. PE(a) 10 and PE(b) 12 are located at the edge of network 18 and connected to ABR 16 via links 20, 22, respectively. Each network device 10, 12, 16 includes one or more forwarding tables (e.g., FIB, LFIB) and routing table (e.g., Routing Information Base (RIB)).

FIG. 1 illustrates two areas, A0 and A1. The term "area" as used herein refers to a collection of routers that share full network topology information with each other. The area may be, for example, an Interior Gateway Protocol (IGP) area (e.g., Open Shortest Path First (OSPF) area or Intermediate System-to-Intermediate System (IS-IS) level). ABR 16 is located in both area A0 and A1. PE(a) 10 and PE(b) 12 are located in area A1. ABR 16 connects non-backbone area A1 to its backbone area A0. PE(a) 10 and PE(b) 12 are non-backbone area neighbors with respect to ABR 16.

For simplification, only three nodes are shown in FIG. 1. Networks 14 and 18 may include any number of network devices and may be connected to other networks or nodes. It is to be understood that the network shown in FIG. 1 is only one example and the embodiments described herein may operate in various network topologies operating different network protocols and having any number or type of network devices or areas.

In one embodiment, the network devices 10, 12, 16 are LSRs configured to operate an Interior Gateway Protocol (e.g., OSPF, IS-IS) running in conjunction with MPLS. PE(a) 10 and ABR 16, and PE(b) 12 and ABR 16, are label distribution peers (neighbors) with respect to the label/NEC mapping information they exchange. As described below, the routers exchange mapping information, indicated at 24a, 24b, 24c, 24d, 24e and 24f in FIG. 1. A label distribution protocol such as disclosed in IETF RFC 3036, "LDP Specification", L. Andersson et al., January 2001 or IETF RFC 5036, "LDP Specification", L. Andersson et al., October 2007, may be used to exchange label information, for example. It is to be understood that other label distribution protocols may be used without departing from the scope of the embodiments.

In some cases, packets with a certain label are forwarded along the same hop-by-hop routed path that would be used for forwarding a packet with a specified address in its network layer destination address field. If packets in a given FEC are just those packets which match a given address prefix in a router's routing table, an FEC can be identified with an address prefix. In this case labels are mapped to an address prefix.

As described below, the routers exchange address prefix/FEC (x) to label (l) mappings, to which the routers may apply selective label retention. The term prefix/FEC as used herein covers the use of forwarding equivalence class or address prefix in the label mappings.

In one embodiment, the LSR is configured to implement selective label retention mode on a per-neighbor basis. For example, ABR 16 may be configured to operate in selective label retention mode only for labels received from PE(a) 10 or from PE(b) 12, or may be configured for selective label retention mode for labels received from both peer nodes 10 and 12 (FIG. 1). The ABR 16 may also be configured for conservative or liberal label retention with respect to mappings received from other LDP neighbors. For example, the ABR 16 may be configured for liberal label retention for mappings received from backbone area routers so that intra-area label mappings are retained without the additional processing required for selective label retention. The routers that operate in selective label retention mode are preferably configured to maintain IGP information such as the originating area of a given route.

Figure 2:
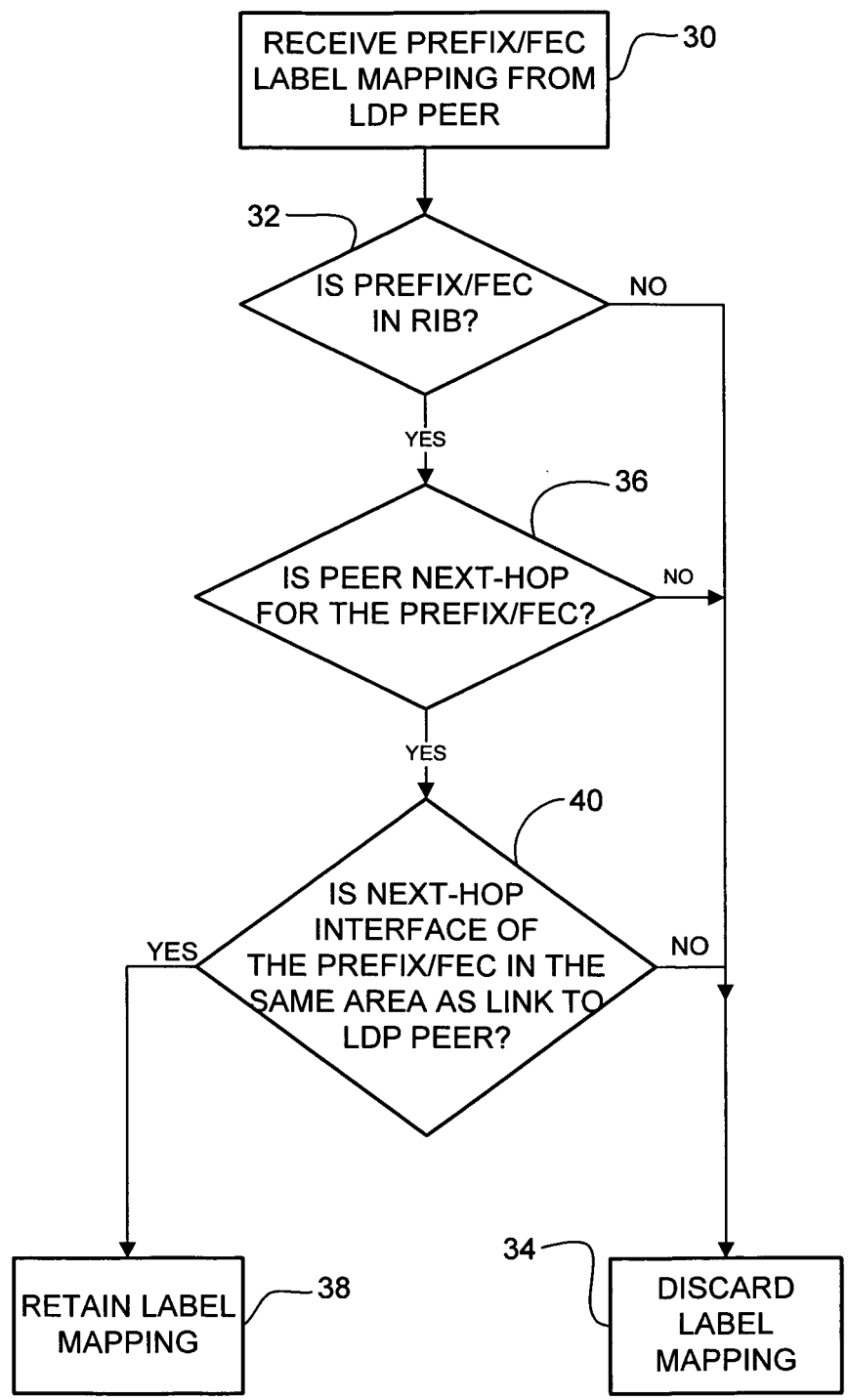
FIG. 2 is a flowchart illustrating an overview of a process for selective label retention, in accordance with one embodiment.

FIG. 2 is a flowchart illustrating an overview of a selective label retention process, in accordance with one embodiment. At step 30, a network device (e.g., LSR 16) receives a prefix/FEC to label mapping from a label distribution peer (neighbor) (e.g., PE(a) 10). The mapping comprises a prefix/FEC (x) and a corresponding label (l). The LSR first checks to see if the received prefix/FEC is contained within the LSR's RIB (step 32). If the prefix/FEC is not contained within the LSR's RIB it is released (discarded) (step 34). If the prefix/FEC is in the RIB, a check is then made to determine if the peer is the next hop for the prefix/FEC (step 36). If the peer is not the next hop for the prefix/FEC, the label mapping is discarded (step 34). If the peer is the next hop for the prefix/FEC, a check is made to determine if the next hop interface of the prefix/FEC is in the same area (e.g., IGP area) as the link to the LDP peer (step 40). If the interface and link are in the same area, the label mapping is retained (step 38). The retained label to prefix/FEC mapping may be inserted in the LFIB. If the next hop interface and the link are in different areas, the label is discarded (released) (step 34). This allows the LSR to discard label mappings for inter-area routes unless the non-backbone area neighbor becomes the next hop for the route.

If a label mapping for a given prefix/FEC is discarded (step 34) (or no longer needed), the LSR may send a label release message to prevent the LSR from receiving the label mapping in the future from that LDP peer, unless it specifically sends a label request. The LSR may also send a label abort request message to abort a previously sent label request message with pending response from the peer so that it is able to cancel a previously sent label request.

It is to be understood that the process illustrated in the flowchart of FIG. 2 is only an example and that steps may be added, deleted, or reordered without departing from the scope of the embodiments.

In one embodiment, the LSR is configured to receive notification of a next hop change in its RIB. In response to the change, the LSR sends a label request message to a specific neighbor, if that neighbor becomes the next hop for a given prefix/FEC and the LSR does not have a label mapping from that neighbor for the prefix/FEC. Details of this embodiment are described below with respect to the flowchart of FIG. 3.

Figure 3:
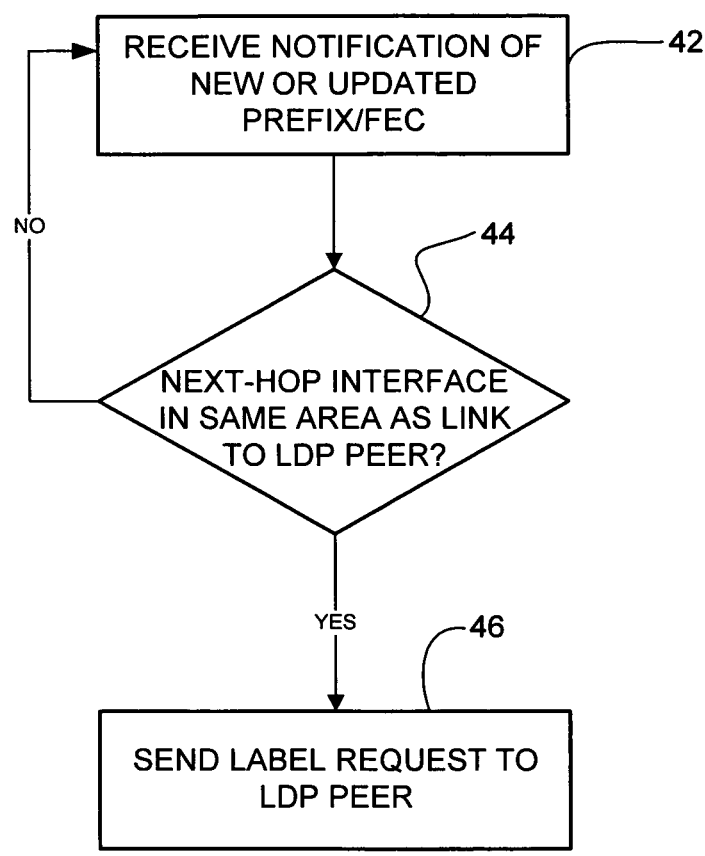
FIG. 3 is a flowchart illustrating details of implementation for the selective label retention process of FIG. 2, in accordance with one embodiment.

FIG. 3 illustrates a process for sending a label request message in response to a next hop change, in accordance with one embodiment. At step 42, the LSR is notified that a prefix/FEC in its RIB has been updated or a new prefix/FEC has been inserted. The LSR first determines if the next hop interface for the prefix/FEC is in the same area as the link to the LDP peer (neighbor) (step 44). If the next hop interface is in the same area as the link to the LDP peer, the LSR sends a label request message to the LDP peer (step 46). The label request is preferably specific for the given prefix/FEC (rather than a wildcard FEC that would cause a full dump of the neighbor LFIB).

Referring again to FIG. 1, an example of the selective label retention process is shown for LDP messages transmitted from PE(a) 10 to ABR 16, and from PE(b) 12 to ABR 16. In the following example, ABR 16 is configured for selective label retention for label mappings received from non-backbone area routers PE(a) 10 and PE(b) 12. ABR 16 receives label mappings l1 and l2 for prefixes/FECs x1, x2, respectively (indicated at 23). ABR 16 then allocates local labels l3 and l4 for prefixes/FECs x1 and x2, respectively, and advertises its label mappings to its downstream neighbors (label distribution peers) PE(a) 10 and PE(b) 12 (indicated at 24a and 24b). Similarly, PE(a) 10 and PE(b) 12 allocate local labels (l5, l6, l7, l8) for each of the received prefixes/FECs and advertise their label mappings back to ABR 16 (indicated at 24c and 24d). The result of this in conventional systems is that ABR 16 has four remote labels (one for each route from each PE) that it will only use if either of the PEs becomes the next hop for either x1 or x2. This is an unlikely scenario and therefore the storing of these label bindings at ABR 16 is typically unnecessary and a waste of resources.

With selective label retention configured at ABR 16, label mappings 24c and 24d are discarded at ABR 16 (as indicated by the X in FIG. 1). The received label mappings 24c, 24d are released because the PEs 10, 12 are not (nor would be) next hop for x1 or x2 and the next hop interface of the prefix/FEC is in a different area than the link to the LDP neighbor. The next hop interfaces of the prefixes/FECs x1, x2 are in area A0, whereas the links 20, 22 to the LDP neighbors PE(a) 10, PE(b) 12 are in area A1.

Also illustrated in FIG. 1 are label mappings distributed from PE(a) 10 and PE(b) 12 for prefix/FEC x4 from network 18. PE(a) 10 and PE(b) 12 receive label l9 for prefix/FEC x4 (indicated at 25). PE(a) 10 and PE(b) 12 allocate labels l10 and l11, respectively, and advertise their label mappings to ABR 16 (indicated at 24e and 24f). These label mappings are retained at ABR 16 since the next hop interface for the prefix/FEC x4 is in the same area (A1) as the links 20, 22 to the LDP peers PE(a) 10, PE(b) 12.

As previously discussed, MPLS convergence may be impacted in the event of a network failure if a label for a specific prefix/FEC needs to be requested from a new next hop neighbor. However, if selective label retention is only used at area border routers (e.g., ABR 16), only inter-area routes are affected, should the new next hop happen to be a PE router (or P router) within a non-backbone area (as all intra-area label mappings are kept by default). This type of failure would typically be uncommon since in a well designed network it is unlikely that a PE would become the next hop for an inter-area route.

Figure 4:
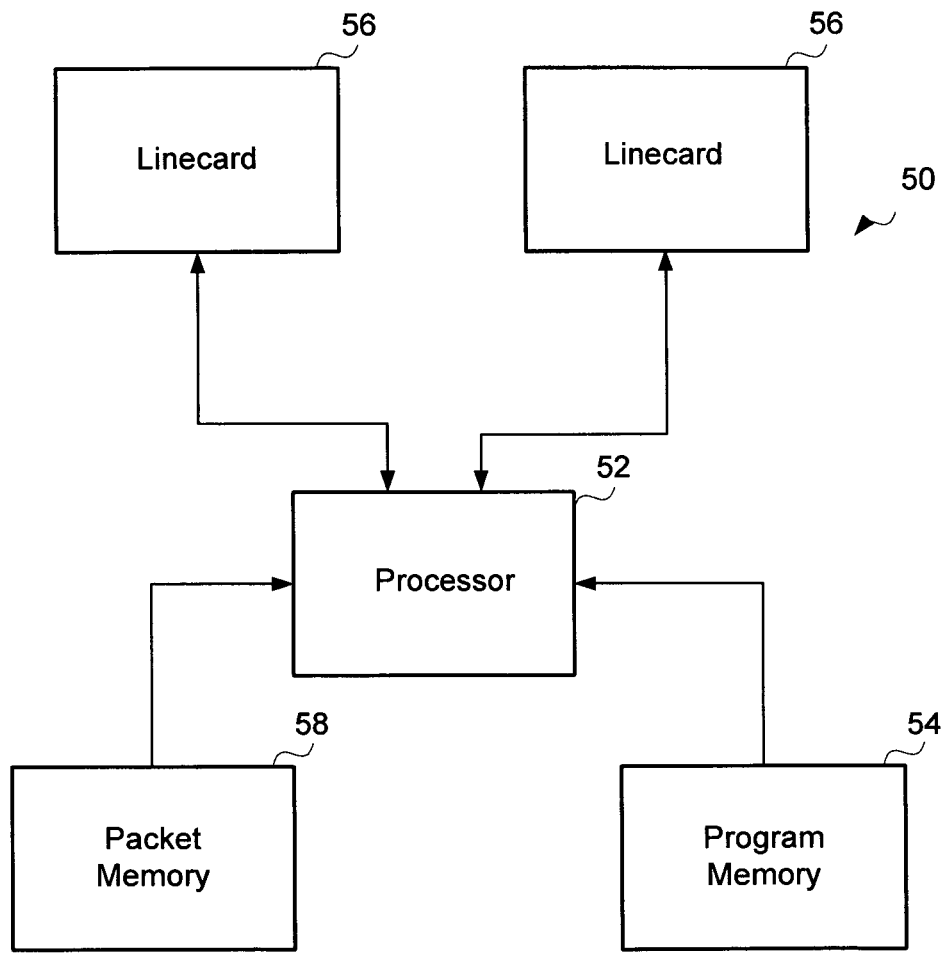
FIG. 4 is a block diagram illustrating an example of a network device useful in implementing embodiments described herein.

FIG. 4 depicts a network device 50 (e.g., ABR 16) that may be used to implement embodiments described herein. The network device 50 may include, for example, a processor (e.g., central processing unit (CPU), multiple processors) 52, program memory 54, linecards 56, and packet memory 58. When acting under the control of appropriate software or firmware, the processor 52 is responsible for such tasks as forwarding table computations, network management, and general processing of packets. It preferably accomplishes all of these functions under the control of software including an operating system and any appropriate applications software. Network device 50 is configured to implement all of the network protocols and extensions thereof described herein. In one embodiment, the network device 50 is a programmable machine that may be implemented in hardware, software, or any combination thereof. Logic may be encoded in one or more tangible media for execution by the processor 52. For example, the processor 52 may execute codes stored in the program memory 54. Program memory is one example of a computer-readable medium. Program memory 54 may be a volatile memory. Another form of computer-readable medium storing the codes is a type of non-volatile storage such as floppy disks, CD-ROMs, DVD-ROMs, hard disks, flash memory, etc. The memory 54 may also be used to store forwarding and routing tables and area information, for example.

Network device 50 interfaces with physical media via a plurality of linecards (network interfaces) 56. The linecards 56 may include Ethernet interfaces, DSL interfaces, Gigabit Ethernet interfaces, 10-Gigabit Ethernet interfaces, SONET interfaces, etc. As packets are received, processed, and forwarded by the network device 50, they may be stored in packet memory 58. The linecards 56 may incorporate processing and memory resources similar to those discussed above in connection with the network device as a whole. It is to be understood that the network device 50 shown in FIG. 4 and described herein is only one example and that different configurations of network devices may be used.

As can be observed from the foregoing, the embodiments described herein provide numerous advantages. For example, the embodiments may reduce the amount of remote peer label state maintained by LDP routers. The smaller remote label state (database) also improves performance and convergence.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:
1. A method comprising:
receiving from a label distribution peer, a prefix/FEC (Forwarding Equivalence Class) to label mapping at a network device;
processing said prefix/FEC to label mapping at the network device to implement selective label retention on a per neighbor basis if the label distribution peer is a next hop for said prefix/FEC, wherein processing comprises:
  determining if a next hop interface of said prefix/FEC is in a same IGP (Interior Gateway Protocol) or IS-IS (Intermediate System-to-Intermediate System) area as a link between the network device and the label distribution peer; and
  retaining said prefix/FEC to label mapping if said next hop interface of said prefix/FEC is in the same area as the link between the network device and the label distribution peer;
  discarding said prefix/FEC to label mapping if said next hop interface of said prefix/FEC is not in the same area as the link between the network device and the label distribution peer.

2. The method of claim 1 further comprising searching a routing table at the network device for said prefix/FEC and releasing said prefix/FEC label mapping if said prefix/FEC is not contained within the routing table.

3. The method of claim 1 wherein the network device is an area border router.

4. The method of claim 1 wherein said label request message identifies said new or updated prefix/FEC.

5. The method of claim 1 further comprising sending a label release message if said prefix/FEC to label mapping received in response to said label request message is no longer needed.

6. The method of claim 1 further comprising configuring a selective label retention mode on the network device prior to receiving said prefix/FEC to label mapping.

7. The method of claim 1 further comprising:
  receiving notification of a new or updated prefix/FEC at a routing table at the network device; and
  sending a label request message to a neighbor if a next hop interface for said new or updated prefix/FEC is in the same area as a link from the network device to the neighbor.

8. An apparatus comprising:
  a processor for receiving from a label distribution peer, a prefix/FEC (Forwarding Equivalence Class) to label mapping, processing said prefix/FEC to label mapping at the network device to implement selective label retention on a per neighbor basis if the label distribution peer is a next hop for said prefix/FEC, wherein processing comprises:
    determining if a next hop interface of said prefix/FEC is in a same IGP (Interior Gateway Protocol) or IS-IS (Intermediate System-to-Intermediate System) area as a link between the apparatus and the label distribution peer; and
    retaining said prefix/FEC to label mapping if said next hop interface of said prefix/FEC is in the same area as the link between the apparatus and the label distribution peer;
    discarding said prefix/FEC to label mapping if said next opt interface of said prefix/FEC is not in the same area as the link between the network device and the label distribution peer.

9. The apparatus of claim 8 further comprising a routing table and wherein the processor is configured to search the routing table for said prefix/FEC and release said prefix/FEC label mapping if said prefix/FEC is not contained within the routing table.

10. The apparatus of claim 8 wherein the apparatus is an area border router.

11. The apparatus of claim 8 wherein said label request message identifies said new or updated prefix/FEC.

12. The apparatus of claim 8 wherein the processor is further configured to send a label release message if said prefix/FEC to label mapping received in response to said label request message is no longer needed.

13. The apparatus of claim 8 wherein the processor is configured to send a label abort request message to abort a previously sent label request message.

14. The apparatus of claim 8 wherein the processor is further configured to:
  receive notification of a new or updated prefix/FEC at a routing table of the apparatus; and
  send a label request message to a neighbor if a next hop interface for said new or updated prefix/FEC is in the same area as a link from the apparatus to the neighbor.

15. An apparatus comprising:
  means for determining if a next hop interface of a prefix/FEC (Forwarding Equivalence Class) to label mapping received from a label distribution peer is in a same IGP (Interior Gateway Protocol) or IS-IS (Intermediate System-to-Intermediate System) area as a link between the apparatus and the label distribution peer;
  means for processing said prefix/FEC to label mapping to implement selective label retention on a per neighbor basis if the label distribution peer is a next hop for said prefix/FEC, wherein processing comprises:
    retaining said prefix/FEC to label mapping if said next hop interface of said prefix/FEC is in the same area as the link between the apparatus and the label distribution peer;
    discarding said prefix/FEC to label mapping if said next hop interface of said prefix/FEC is not in the same area as the link between the network device and the label distribution peer.

16. The apparatus of claim 15 further comprising means for releasing said prefix/FEC label mapping if said prefix/FEC is not contained within a routing table at the network device.

17. The apparatus of claim 15 wherein the apparatus is an area border router.

18. The apparatus of claim 15 further comprising means for sending a label release message if said prefix/FEC to label mapping received in response to said label request message is no longer needed.

19. The apparatus of claim 15 further comprising means for configuring a selective label retention mode on an interface to the label distribution peer prior to receiving said prefix/FEC to label mapping.

20. The apparatus of claim 15 further comprising means for receiving notification of a new or updated prefix/FEC at a routing table at the apparatus and sending a label request message to a neighbor if a next hop interface for said new or updated prefix/FEC is in the same area as a link from the apparatus to the neighbor.

* * * * *